(12) United States Patent
Pjevach et al.

(10) Patent No.: US 6,616,149 B1
(45) Date of Patent: Sep. 9, 2003

(54) QUICK-RELEASE CHUCK HAVING COMPACT COLLAR

(75) Inventors: Robert Pjevach, Lindenhurst, IL (US); Brady Groth, Evanston, IL (US)

(73) Assignee: S-B Power Tool Corporation, Broadview, IL (US)

(*) Notice: Subject to any disclaimer, the term of this patent is extended or adjusted under 35 U.S.C. 154(b) by 0 days.

(21) Appl. No.: 10/101,276

(22) Filed: Mar. 19, 2002

(51) Int. Cl.[7] .............................................. B23B 31/107
(52) U.S. Cl. ............................ 279/75; 279/74; 279/82; 279/905
(58) Field of Search ................................ 279/22, 30, 43, 279/45, 50, 57, 60–65, 74, 75, 82, 157, 904, 905; 408/240

(56) References Cited

U.S. PATENT DOCUMENTS

| | | | |
|---|---|---|---|
| 4,184,692 A | | 1/1980 | Benson et al. |
| 4,252,333 A | * | 2/1981 | Vogel ........................... 279/64 |
| 4,287,923 A | * | 9/1981 | Hornung ...................... 81/429 |
| 4,859,125 A | | 8/1989 | Lubiarz |
| 4,900,202 A | | 2/1990 | Wienhold |
| 5,013,194 A | | 5/1991 | Wienhold |
| 5,016,892 A | * | 5/1991 | Lafforgue et al. ............ 279/82 |
| 5,062,749 A | | 11/1991 | Sheets |
| 5,188,378 A | * | 2/1993 | Erienkeuser ................. 279/22 |
| 5,464,229 A | | 11/1995 | Salpaka |
| 5,603,516 A | | 2/1997 | Neumaier |
| 5,678,961 A | | 10/1997 | Fleege et al. |
| 5,820,135 A | | 10/1998 | Han et al. |
| 5,882,153 A | * | 3/1999 | Mack et al. .................. 279/62 |
| 6,193,242 B1 | | 2/2001 | Robison |
| 6,199,872 B1 | * | 3/2001 | Hasan .......................... 279/30 |
| 6,224,303 B1 | | 5/2001 | Wheeler et al. |
| 6,241,026 B1 | | 6/2001 | Wache et al. |
| 2001/0013683 A1 | | 8/2001 | Yahagi |
| 2001/0017447 A1 | | 8/2001 | Baumann et al. |

* cited by examiner

*Primary Examiner*—Steven C. Bishop
(74) *Attorney, Agent, or Firm*—Gardner Carton & Douglas LLC

(57) ABSTRACT

The quick-release chuck for a rotary power tool is provided for holding a tool bit. The chuck includes a barrel having an axial bore to receive the tool bit and an axially movable sleeve operable to position a locking member to selectively lock or release the tool bit. A proximal end of the chuck near the housing of the power tool includes a low-profile collar which holds a spring in compression against the sleeve, biasing the sleeve in a distal, locked position. The components of the chuck may advantageously be assembled in a stacked manner. The low-profile collar permits the chuck to occupy a minimal length and to be positioned with a minimal separation from the housing of the power tool for enhanced safety.

7 Claims, 4 Drawing Sheets

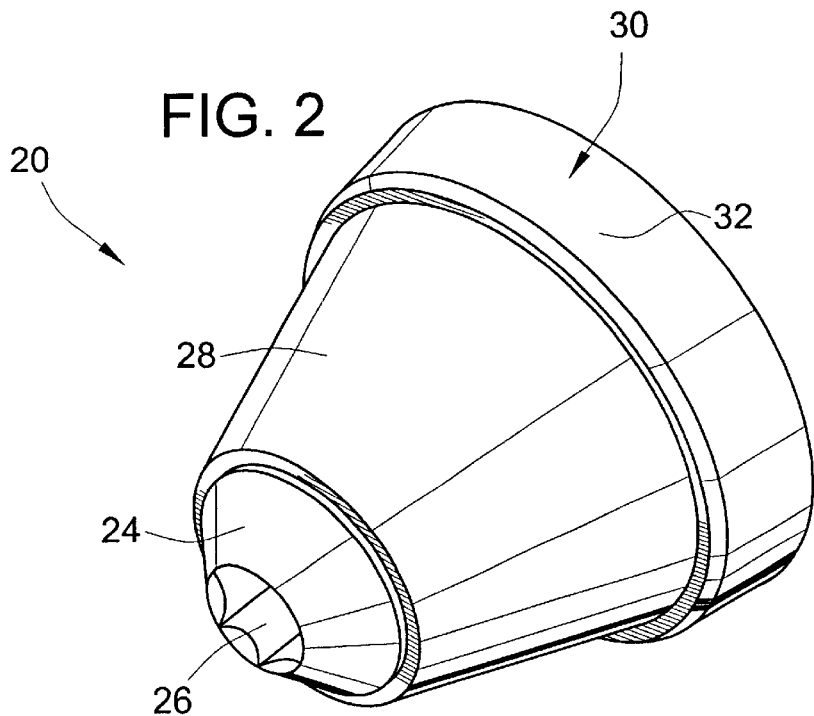
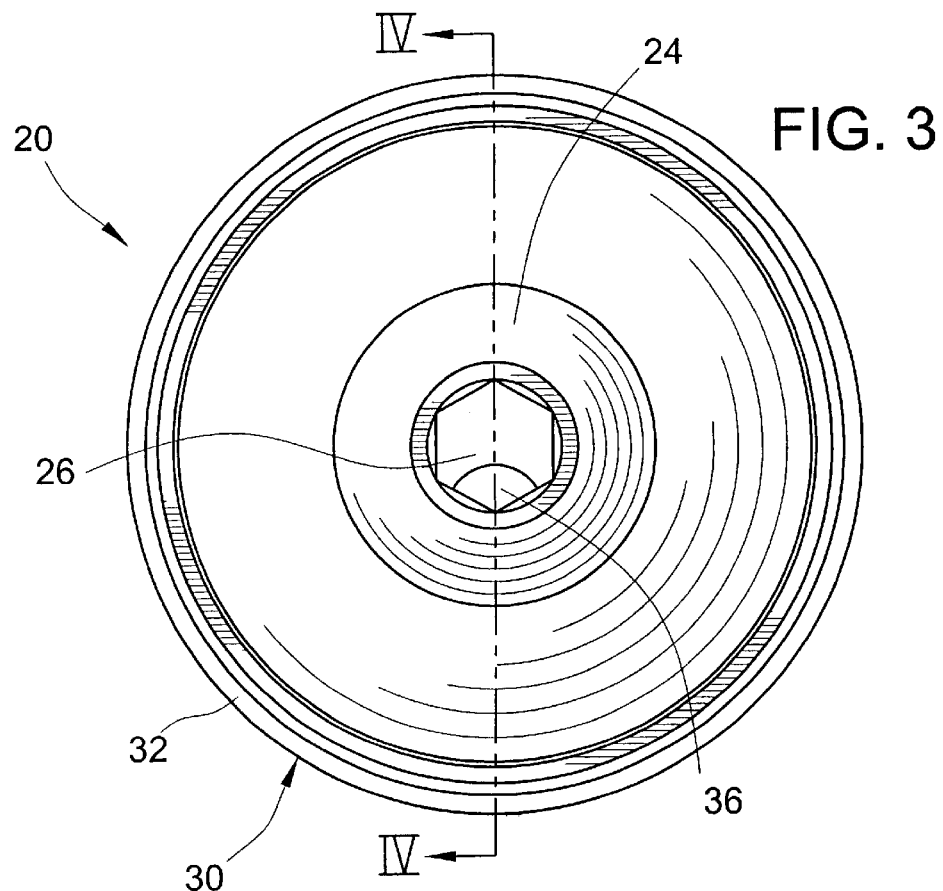

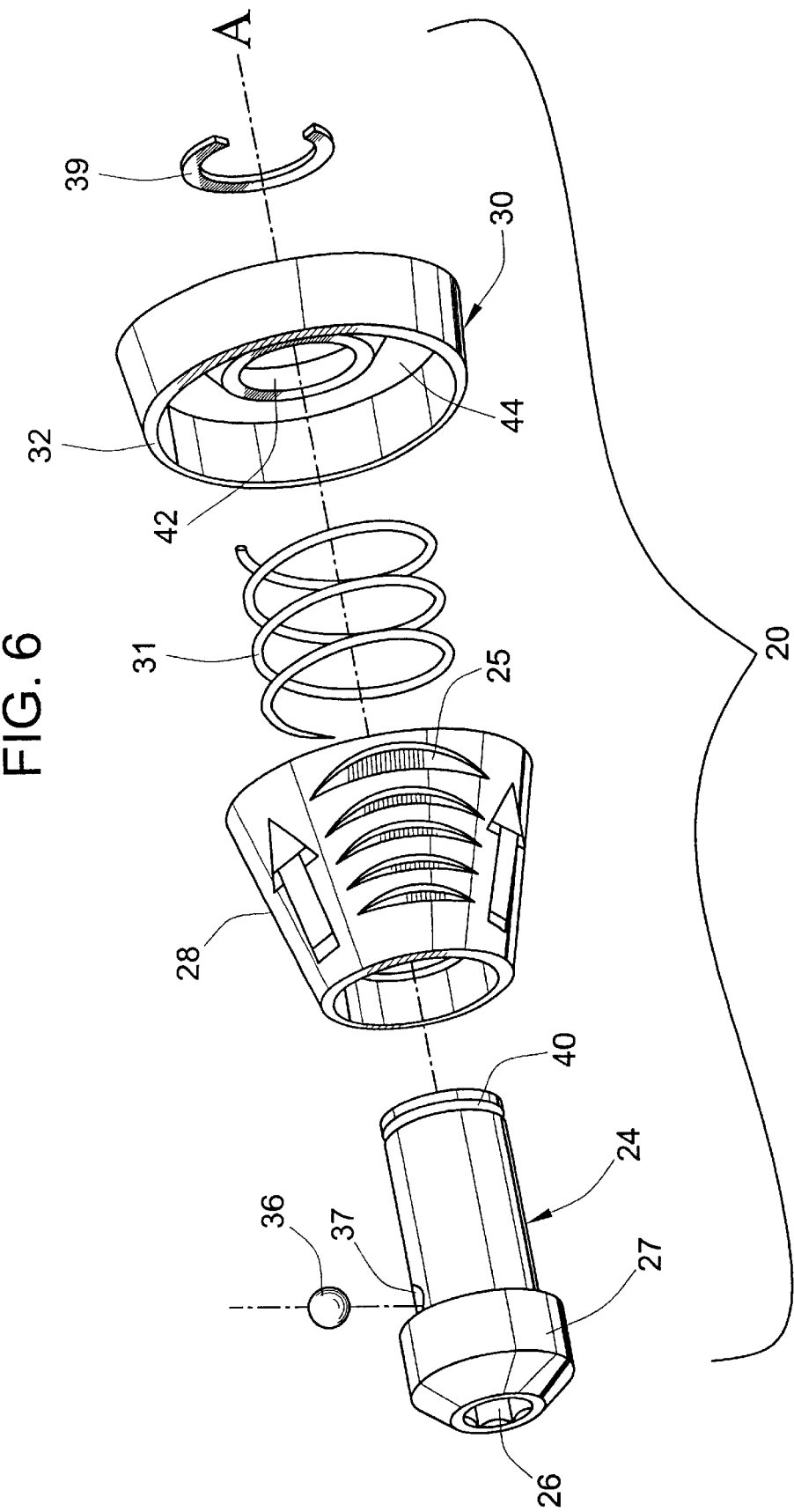

QUICK-RELEASE CHUCK HAVING COMPACT COLLAR

FIELD OF THE INVENTION

The present invention generally relates to rotary tools and more particularly relates to a quick-release chuck having an axially slidable member to actuatably release or hold a tool bit.

BACKGROUND OF THE INVENTION

Chucks for rotary tools are generally known. A chuck is securable to a rotatable shaft of a power tool and is operable to hold a replaceable tool bit. Known quick-release chucks have a bore in which a tool bit is received, and the chuck includes a locking element which is selectively actuatable to secure or release the tool bit.

Conventional quick-release chuck structures have implemented components which occupy a significant axial length. It is desirable to provide a chuck that has a low-profile, compact structure with a minimal length.

At least some conventional quick-release chucks have a configuration such that, when mounted to a rotatable shaft of a power tool, a significant gap exists between the chuck and a housing of the power tool. It is desirable to minimize the gap for safety and compactness.

Also, conventional chucks have included a large number of components, requiring a complex and expensive assembly process. Accordingly, a need exists for an improved chuck that has few components and is relatively easy to assemble.

SUMMARY OF THE INVENTION

The present invention provides an improved quick-release chuck having a compact profile and view components. In an embodiment, the chuck includes a barrel configured to be mounted to a rotatable shaft of a rotary power tool. The barrel has an axial bore for receiving and holding a tool bit. A moveable sleeve fits concentrically around the barrel and is axially moveable relative thereto for actuating one or more locking member, such as a radially-moveable ball positioned in a hole through the barrel to releasably secure the tool bit in the bore. To release the locking member, the moveable sleeve is axially retractable toward the power tool. The chuck additionally includes a collar which has a low-profile shape. In particular, the collar has a central flange which is disposed around the barrel, a planar web portion which extends radially outwardly from the central flange and an outer guide flange that extends from an outer periphery of the planar portion in a direction away from the rotary power tool. The outer guide flange is shaped to receive and guide a proximal portion of the moveable sleeve when the sleeve is pulled to release the tool bit. The outer guide flange also serves to cover a gap between a proximal side of the moveable sleeve and the planar web portion of the collar. The collar is secured to the barrel in a position closely proximal to the power tool housing. The structure of the collar minimizes the gap between the chuck and the housing of the rotary power tool, advantageously enhancing safety and minimizing the necessary length of the chuck.

In an embodiment, a distal end of the barrel includes a radially projecting shoulder to limit the axial travel of the moveable sleeve. The collar is concentrically positionable around a proximal end of the barrel, capturing a compressible spring or other biasing member between the moveable sleeve and the collar. The collar is preferably secured by a retainer ring received within a detent of the barrel against a proximal side of the collar.

In an embodiment, the moveable sleeve, spring, collar, and retainer ring are easily assembled onto the barrel in a stackable manner from the proximal end of the chuck. The collar acts as a cap which compresses the biasing member and effectively holds the components of the chuck in an assembled condition. The stackable configuration advantageously facilitates an assembly of the chuck in a simple and efficient manner.

These and other features and advantages of the present invention are described in, and will be apparent from the following description, claims and figures.

BRIEF DESCRIPTION OF THE DRAWINGS

FIG. 2 is a perspective view of the chuck of FIG. 1.

FIG. 3 is a distal end view of the chuck of FIGS. 1 and 2.

FIG. 6 is an exploded view of the chuck.

DETAILED DESCRIPTION OF THE PRESENTLY PREFERRED EMBODIMENTS

Figure 1:
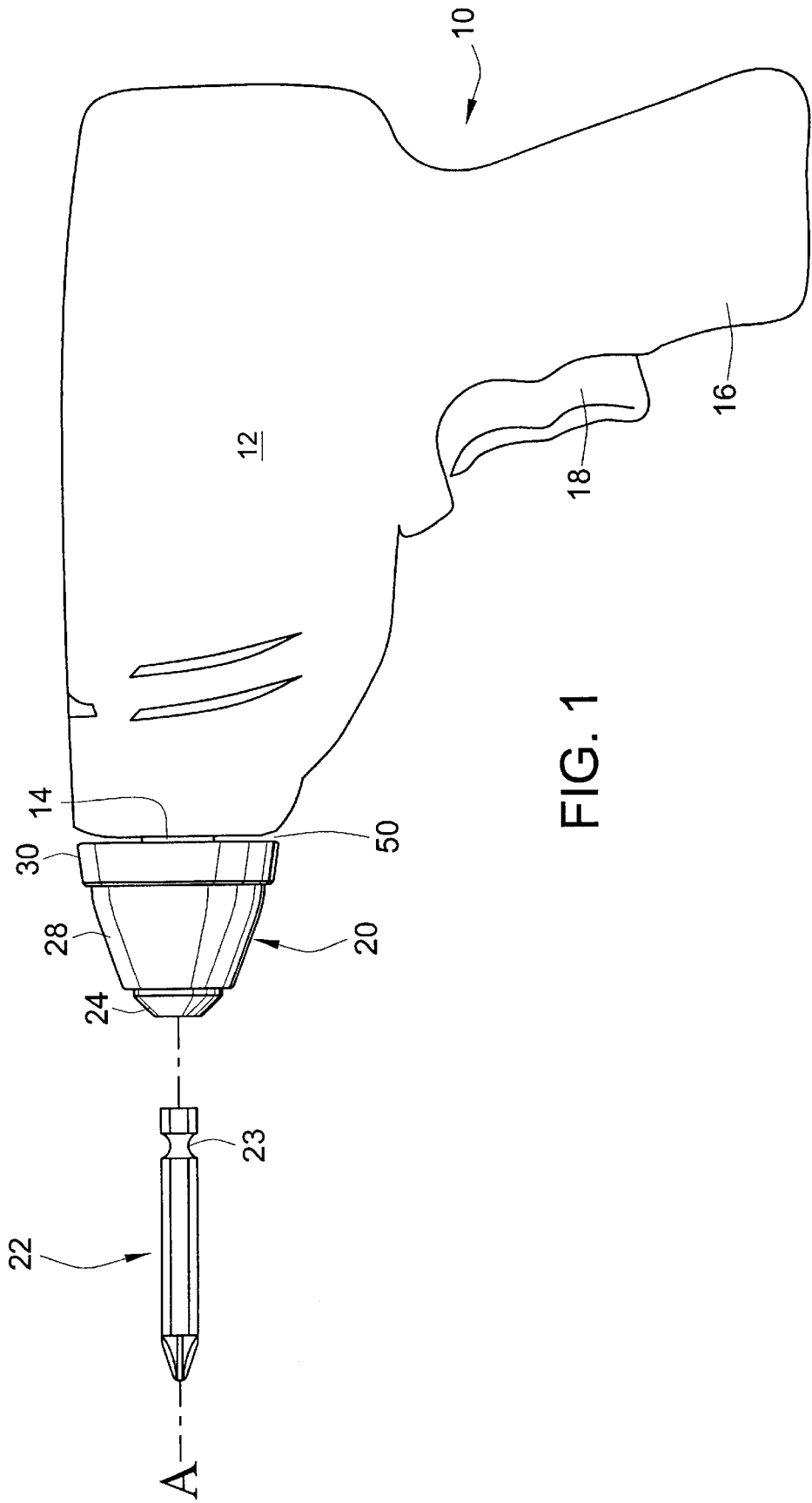
FIG. 1 is a side elevation of a rotary power tool equipped with a chuck having features according to teachings of the present invention, a replaceable tool bit to be received by the chuck shown in exploded form.

Now turning to the drawings, wherein like numerals designate like components, FIG. 1 illustrates a rotary power tool 10 having a housing 12. The housing 12 contains an electric motor (not shown) operable to rotatably drive a shaft 14 that rotates about an axis A. In the illustrated embodiment, the housing 12 is shaped to include a handle 16 to be gripped by a user and a trigger switch 18 that selectively actuates the motor.

FIG. 1 also illustrates a quick-release chuck 20 mounted to the shaft 14. The chuck 20 is operable to securely hold a tool bit 22 driven by the rotary power tool 10. In the illustrated embodiment, the tool bit 22 is configured as a cross-headed screwdriver tip, however, those skilled in the art will recognize that the chuck 20 is useful to hold any other type of rotating tool bit, such a flat headed screwdriver, boring tool, grinding bit, wire brush, socket, drill bit, etc. The tool bit is preferably of a type that has a locking recess 23.

Referring to FIGS. 1–3, the chuck 20 generally includes a central barrel 24 having an axial bore 26 for receiving and holding the tool bit (FIG. 1). The barrel 24 is generally cylindrical and oriented along a central axis A of the chuck, which coincides of an axis of rotation of the shaft of the power tool 10. In the illustrated example, the bore 26 has a hex-shaped cross section, useful for transmitting torque to a cooperatively shaped tool bit, however, the bore could have another appropriate shape. Concentrically mounted to the barrel 24, the chuck 20 also includes a moveable sleeve 28 and a collar 30.

The chuck 20 will be described herein with reference to a distal end and an opposite proximal end of the chuck. The bore 26 opens at the distal end of the barrel 24, facing away from the rotary power tool 10 (FIG. 1). The proximal end of the chuck is near the power tool 10.

So that a user can easily release or secure a tool bit, the chuck 20 includes a moveable sleeve 28 which is axially moveable relative to the barrel 24. More particularly, still referring to FIG. 1, movement of the movable sleeve 28 toward the power tool 10 along the axis A is operable to actuate a locking mechanism for selectively releasing or securing the tool bit in the bore, as will be described below in greater detail with reference to FIGS. 4–6. When the user releases the movable sleeve 28, the sleeve is biased to move in the distal direction, away from the power tool, to thereby actuate the locking mechanism which secures the tool bit in the bore. The sleeve 28 is preferably shaped for easy gripping to be manually pulled toward the power tool 10. As illustrated in FIGS. 1–6, for example, the movable sleeve 28 has generally frustoconical exterior shape, tapering from a narrow diameter at a distal end of the sleeve to relatively wider diameter near a proximal end of the sleeve. The movable sleeve 28 may optionally include recesses 25 shaped to provide enhanced grip as shown in FIG. 6.

To guide and cover a proximal portion of the moveable sleeve, an annular collar 30 is mounted to the barrel 24. The collar 30, illustrated in FIGS. 1–6, is shaped to guidably receive a portion of the movable sleeve 28 as the sleeve is pulled to release the locking member 36. In particular, the collar 30 includes an outer guide flange 32 that is disposed exteriorly around a portion of the movable sleeve. Generally, the outer guide flange 32 peripherally covers a proximal portion of the moveable sleeve 28 as the sleeve 28 slides axially on the barrel.

Figure 4:
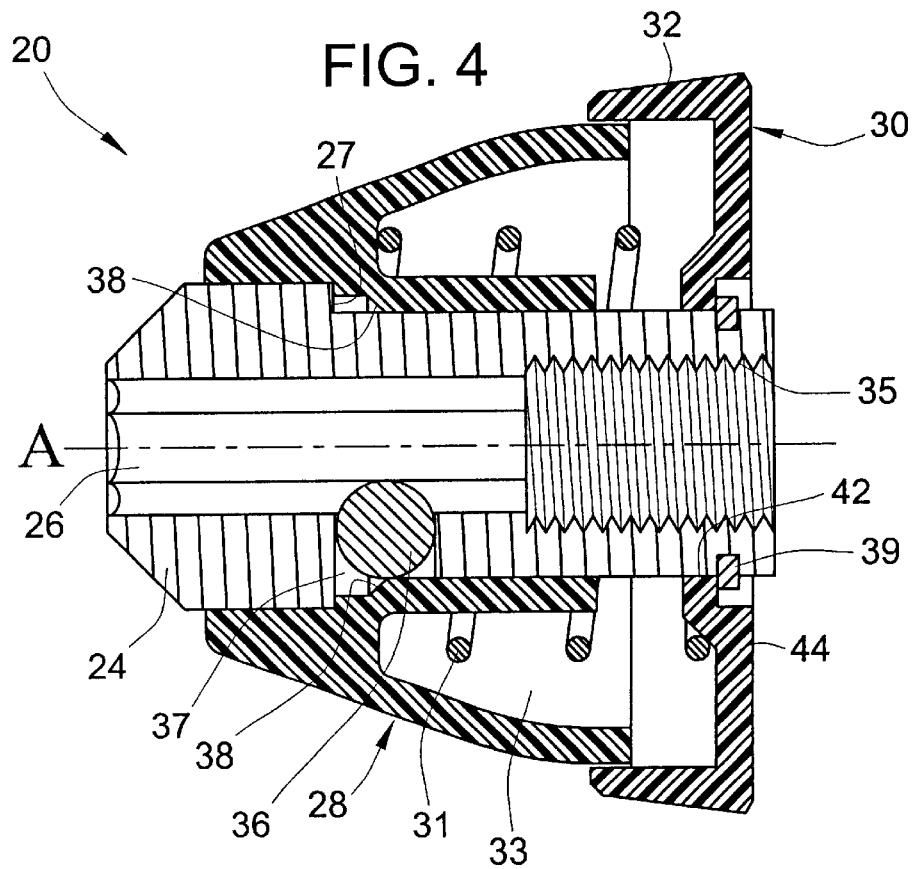
FIG. 4 is a sectional view as taken generally along line IV—IV of FIG. 3, the moveable sleeve in an extended position.
Figure 5:
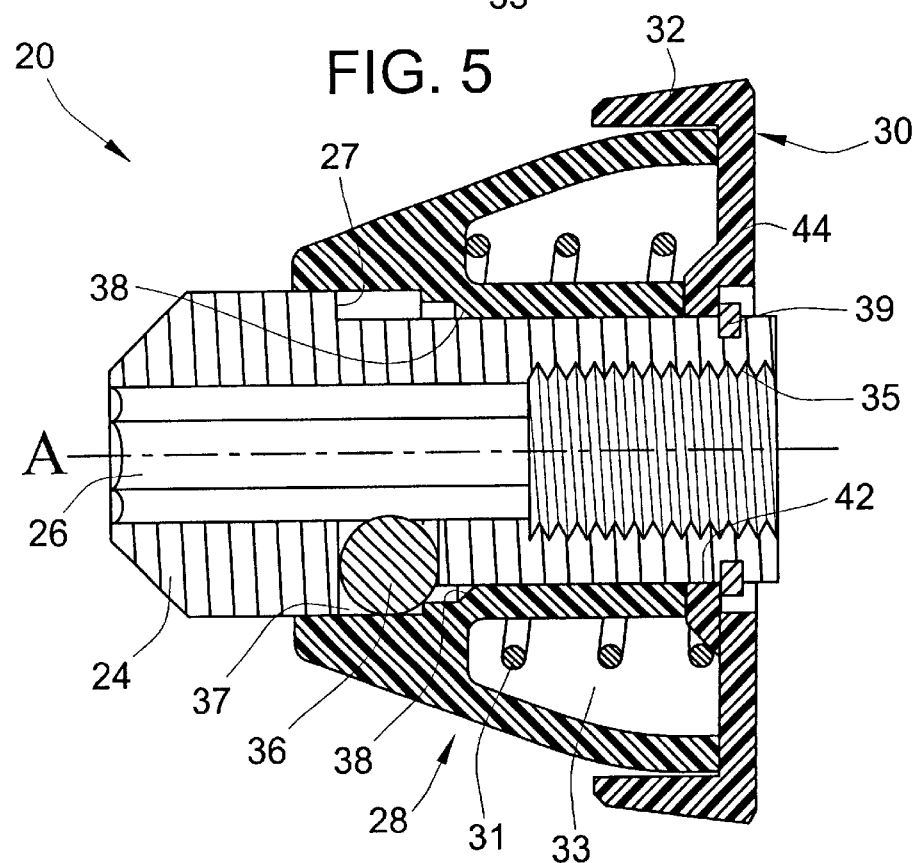
FIG. 5 is a sectional view of the chuck of FIG. 4, the moveable sleeve in a retracted position.

The movable sleeve 28 is movable between an extended position, as illustrated in FIG. 4, and a retracted position, as illustrated in FIG. 5. To limit the axial movement of the movable sleeve 28 in the distal direction, a distal end of the barrel 24 has a radially projecting shoulder 27, as illustrated in FIGS. 4 and 5. The axial movement of the sleeve 28 in the proximal direction is limited by contact against the collar 30, as illustrated in FIG. 5.

The chuck 20 includes a biasing member 31 which is held in compression between the sleeve 28 and the collar 30 to normally hold the sleeve 28 in the extended position, wherein the sleeve contacts against the shoulder 27. In the illustrated embodiment, the biasing member 31 is a coil type spring, however those skilled in the art will recognize that other biasing members and types of springs could be used. The sleeve 28 includes an annular interior cavity 33 to accommodate the biasing member 31.

For mounting the chuck 20 to the shaft of the rotary power tool 10 (FIG. 1), the proximal end of the barrel includes an opening 34 having internal threads 35, as illustrated in FIGS. 4 and 5, wherein the threads securely engage correspondingly external threads on the shaft in a manner which will be understood by those skilled in the art. It should be recognized that other structures could be used for mounting the proximal end of the barrel to the shaft.

Now referring to FIGS. 4–6, the chuck 20 is operable so that slidable movement of the moveable sleeve 28 is effective to actuate the at least one locking member 36. In the illustrated example, the locking member 36 is a ball. The locking member 36 is positioned in a hole 37 that extends generally radially through the barrel 24. Those skilled in the art will recognize that the locking member 36 could also be any structure effective to cause a radial force against the tool bit, such as jaws, a pin, etc.

The locking member 36 moves in a radial direction relative to the barrel as a result of contact against the moveable sleeve. FIG. 4 illustrates the chuck 10 when the sleeve 28 is in an extended position, wherein the locking member 36 is positioned radially inward into the bore 26 for locking the tool bit. As shown in FIG. 4, a portion of the locking member 36 projects within the bore 26 to be received within the recess 23 of the tool bit. (FIG. 1). FIG. 5 illustrates the chuck 10 when the sleeve 28 is in the retracted position wherein the locking member 36 releases the tool bit. To move the locking member radially, an interior of the moveable sleeve 28 has an annular tapered surface 38 that contacts the locking member 36. As the sleeve 28 moves toward the distal end, the annular tapered surface 38 progressively forces the locking member 36 radially inwardly toward the axis A. When the sleeve 28 is retracted toward the proximal end, the annular tapered surface 38 permits the locking member 36 to move radially outwardly, free from the recess 23 of the tool bit (FIG. 1).

The collar 30 is secured to the barrel 24 by a retainer ring 39, shown in FIGS. 4–6. More particularly, the retainer ring 39 is positioned within an annular detent 40 (FIG. 8) in the barrel 24 against a proximal side of the collar. As shown in FIGS. 4 and 5, the biasing member 31 is compressed between the collar 30 and the moveable sleeve 28 to urge the sleeve toward the distal end. The biasing member 31 also urges the collar toward the proximal direction against the ring.

According to an aspect of the invention, the collar 30 generally acts to hold together and contain the components of the chuck 20 from the proximal end. As will be apparent from the exploded view of FIG. 6, the moveable sleeve 28, spring 31, collar 30, and retainer ring 39 are easily assembled onto the barrel 24 in a stackable manner from the proximal end of the chuck 20. This advantageously facilitates an assembly of the chuck 20 in a simple and efficient manner. To assemble the chuck 20, the locking member 36 is placed in the hole 37 of the barrel 24 and the sleeve 28 is fitted over the barrel. The biasing member 31 is then placed in the cavity 33 of the sleeve 28. The collar 30 is positioned on the barrel 24 and moved distally toward the sleeve, compressing the biasing member 31. The collar 30 is moved to position on the barrel 24 so that the detent 40 is accessible from a proximal side of the collar. At this point, the retainer ring 39 is snapped into the detent 40, and pressure on the collar 30 can be released, supported against the retainer ring 39. The retainer ring 39 is sized so that the collar 30 cannot slide, thereby supporting the collar in a mounted position on the barrel.

In accordance with an aspect of the invention, the collar has a low profile shape. For example, in the embodiment illustrated in FIGS. 4–6, the collar 30 includes a central flange 40 disposed around the barrel, a generally planar web 44 extending radially outwardly from the central flange 42. The outer guide flange 32 extends from an outer periphery of the web 44 in a distal direction away from the rotary power tool. The moveable sleeve 28 is axially retractable into an interior of the collar 30 along the guide flange 32, toward the power tool to release the locking member.

The outer guide flange 32 covers the proximal end of the movable sleeve. As a result, the outer guide flange 32 advantageously prevents objects from becoming lodged under the movable sleeve 28, prevents the moveable sleeve 28 from pinching skin, clothing, or other objects, and reduces the introduction of dirt into the chuck 20.

The collar 30 is secured to the barrel 24 in a position closely proximal to the housing of the power tool. The low-profile shape of the collar advantageously permits the collar 30, and the chuck 20, to be positioned closely to the housing 12 of the power tool 10, as shown by FIG. 1. This advantageously minimizes a gap 50 between the chuck 20 and the housing 12, enhancing safety. Additionally, the low-profile shape of the collar 30 advantageously minimizes the length of the chuck 20 by permitting all of the chuck components to be positioned near the power tool.

With reference to FIGS. 4–6, the central flange 42 is preferably offset in direction toward the distal end relative to the generally radial web 44 so that the retainer ring 39 resides in a recess of the collar 30. The offset permits the collar 30 to reside closer to the housing of the power tool, allowing the chuck 20 to have a compact length.

All references, including publications, patent applications, and patents, cited herein are hereby incorporated by reference to the same extent as if each reference were individually and specifically indicated to be incorporated by reference and were set forth in its entirety herein.

The barrel is preferably made of metal, such as steel or some other hard alloy. The sleeve 28 and collar 30 may be made of durable plastic.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A chuck for a rotary power tool comprising:
   a barrel having a proximal end, a distal end opposite the proximal end, and an axial bore extending at least partially therethrough to receive a tool bit from the distal end, the proximal end of the barrel adapted to mount to a shaft of the power tool;
   a movable sleeve concentrically around the barrel, the sleeve being slidably movable relative to the barrel in an axial direction between an extended position and a retracted position;
   a locking member actuatable by axial movement of the sleeve to selectively secure and release the tool bit with respect to the axial bore, thereby facilitating selective insertion and removal of the tool bit; and
   a collar fixed to the barrel, the collar including a central flange disposed around the proximal end of the barrel, a generally planar web extending radially outwardly from the central flange and a outer guide flange extending from an outer periphery of the web in a distal direction;
   wherein the movable sleeve is guided along an interior side of the outer guide flange when the moveable sleeve moves between the extended and retracted positions.

2. The chuck of claim 1, wherein the movable sleeve is tapered in shape, increasing in diameter from the distal end to the proximal end of the movable sleeve, a portion of the movable sleeve having the greatest diameter being guided by the guide flange.

3. The chuck of claim 1, wherein the locking member includes at least one ball which resides in a hole of the barrel, and wherein the sleeve includes a beveled surface which acts against the ball to cause the ball to move radially relative to the bore when the sleeve is axially moved.

4. A quick-release chuck comprising:
   a generally cylindrical barrel configured to be mounted to a rotatable shaft of a rotary power tool, the barrel including an axial bore for receiving and holding a tool or bit, the barrel having a distal end and a proximal end, the barrel having a radially projecting shoulder;
   a moveable sleeve that fits concentrically around the barrel and is axially moveable relative thereto for actuating one or more locking member effective to selectively lock or release a tool bit in the bore, movement of the sleeve being limited toward the distal end by contact against the shoulder;
   a biasing member positioned to urge the moveable sleeve toward the distal end; and
   a collar concentrically disposed around the barrel to hold the biasing member in compression between the sleeve and the collar, the collar having a low profile configuration and including an annular central flange which fits against the barrel, a generally planar web which extends radially outwardly from the central flange, and an outer guide flange which extends from a periphery of the generally planar web to cover a portion of the portion and a circumferential outer guide flange which extends from an outer periphery of the generally planar web in a direction away from the rotary power tool;
   wherein a portion of the sleeve covered by the outer guide flange, the sleeve being received by the collar when the sleeve is axially moved toward the proximal end.

5. The chuck of claim 4, configured so that the barrel can receive the sleeve, biasing member and collar from a proximal direction during assembly of the chuck.

6. The chuck of claim 4, wherein the sleeve has an exterior shape that is generally tapered to increase in diameter from the distal end to the proximal end.

7. The chuck of claim 4, wherein the locking member is shaped to mate with a locking recess in a tool bit in the bore, wherein axial movement the sleeve is operable to move the locking member in a radial direction so that a portion of the locking member projects into the bore when the sleeve is distally extended so that the locking member does not project into the bore when the sleeve is retracted into the collar.

* * * * *